United States Patent
Tsubuko et al.

(10) Patent No.: US 6,692,881 B2
(45) Date of Patent: Feb. 17, 2004

(54) RECORDING LIQUID AND IMAGE FORMING METHOD USING THE RECORDING LIQUID

(75) Inventors: Kazuo Tsubuko, Numazu (JP); Tsuyoshi Asami, Yokohama (JP); Aiko Ishikawa, Numazu (JP)

(73) Assignee: Ricoh Company Limited, Tokyo (JP)

(*) Notice: Subject to any disclaimer, the term of this patent is extended or adjusted under 35 U.S.C. 154(b) by 0 days.

(21) Appl. No.: 10/156,827

(22) Filed: May 30, 2002

(65) Prior Publication Data
US 2003/0099894 A1 May 29, 2003

(30) Foreign Application Priority Data

| May 30, 2001 | (JP) | 2001-163266 |
| Jun. 21, 2001 | (JP) | 2001-187937 |
| Jul. 5, 2001 | (JP) | 2001-205347 |

(51) Int. Cl.$^7$ .............................................. G03G 9/125
(52) U.S. Cl. ...................................... 430/116; 430/119
(58) Field of Search ................................ 430/116, 114, 430/119, 45

(56) References Cited

U.S. PATENT DOCUMENTS

| 4,029,826 A | * 6/1977 | Nakano et al. ............... 427/16 |
| 4,985,733 A | 1/1991 | Kurotori et al. |
| 5,026,621 A | 6/1991 | Tsubuko et al. |
| 5,061,587 A | 10/1991 | Tsubuko et al. |
| 5,085,965 A | 2/1992 | Nanya et al. |
| 5,099,289 A | 3/1992 | Kurotori et al. |
| 5,169,739 A | 12/1992 | Umemura et al. |
| 5,189,102 A | 2/1993 | Tsubuko et al. |
| 5,328,794 A | 7/1994 | Kazuo et al. |
| 5,759,733 A | 6/1998 | Tsubuko et al. |
| 5,851,717 A | 12/1998 | Tsubuko et al. |
| 5,952,048 A | 9/1999 | Tsubuko et al. |
| 6,020,103 A | * 2/2000 | Tsubuko et al. ............. 430/117 |

FOREIGN PATENT DOCUMENTS

| JP | 49-19175 | 5/1974 |
| JP | 62-174282 | 7/1987 |
| JP | 62-207377 | 9/1987 |
| JP | 63-75068 | 4/1988 |
| JP | 63-301966 | 12/1988 |
| JP | 63-301967 | 12/1988 |
| JP | 63-301968 | 12/1988 |
| JP | 63-301969 | 12/1988 |
| JP | 64-50062 | 2/1989 |
| JP | 64-50063 | 2/1989 |
| JP | 64-50064 | 2/1989 |
| JP | 64-50065 | 2/1989 |
| JP | 64-50066 | 2/1989 |
| JP | 64-50067 | 2/1989 |
| JP | 64-52167 | 2/1989 |
| JP | 64-87677 | 3/1989 |
| JP | 1-142560 | 6/1989 |
| JP | 1-142561 | 6/1989 |
| JP | 9-208873 | 8/1997 |

* cited by examiner

*Primary Examiner*—John Goodrow
(74) *Attorney, Agent, or Firm*—Oblon, Spivak, McClelland, Maier & Neustadt, P.C.

(57) ABSTRACT

A recording liquid including a colorant and a carrier liquid including at least one of a liquid paraffin and a linear silicone oil. The recording liquid is an inkjet ink, a printing ink, a marker ink, a stencil ink, an electronic recording ink, a non-aqueous paint, a liquid developer or the like. When the recording liquid is a non-aqueous paint or a liquid developer, the recording ink further includes a resin.

21 Claims, 6 Drawing Sheets

RECORDING LIQUID AND IMAGE FORMING METHOD USING THE RECORDING LIQUID

BACKGROUND OF THE INVENTION

1. Field of the Invention

The present invention relates to a recording liquid such as print inks, marker inks, inkjet inks, electronic recording inks, non-aqueous paints, and liquid developers for use in electrophotography, electrostatic recording and electrostatic printing. In addition, the present invention also relates to an image forming method using the recording liquid (i.e., liquid developer).

2. Discussion of the Background

Electrophotographic developers are classified into dry developers and liquid developers. Liquid developers have an advantage over dry developers such that clear images can be produced because of including a toner having a finer particle diameter than that of the toner included in the dry developers.

Liquid developers are typically prepared by dispersing a resin, a colorant and a charge controlling agent in a non-aqueous solvent having a high electric resistance. The particle diameter of the toner dispersed in such liquid developers is typically from 0.1 to 2.0 $\mu$m. In addition, liquid developers do not use an iron power carrier, which is typically used for dry developers and has a heavy weight, when images are formed, and therefore the liquid developers have the following advantages over dry developers:

(1) the stress applied to image forming apparatus is much less than that applied to image forming apparatus by dry developers; and
(2) high speed image recording can be performed.

As to the image fixing method for fixing an image formed by a liquid developer on a receiving material, the following fixing methods are well known:

(1) a fixing method in which an image is fixed by bringing the image into contact with a heat roller;
(2) a fixing method in which an image is fixed by being heated with hot air;
(3) a fixing method in which an image on a receiving material is fixed by bringing the backside of the receiving material into contact with a hot plate; etc.

In any one of the fixing methods mentioned above, the solvent in the liquid developer used is released into atmosphere. This is not preferable in view of environmental protection.

In attempting to prevent releasing of solvent vapors, Japanese Laid-Open Patent Publication No. (hereinafter referred to as JOP) 09-208873 discloses a fixing method in which an image formed by a liquid developer is fixed by being exposed to ultraviolet rays. However, the method has a disadvantage such that the image forming apparatus using the method becomes large in size.

JOPs 63-301966 to 301969, 64-50062 to 50067, 64-52167 and 64-142560 to 142561 have disclosed liquid developers for the image forming method using a heat fixing roller mentioned above. These liquid developers include an aliphatic hydrocarbon having a low boiling point as a main component of the carrier liquid. Therefore, the aliphatic hydrocarbon is released from the image forming apparatus into atmosphere. In addition, a silicone oil has to be applied to the heat fixing roller to prevent an offset problem in that a toner image adheres to the fixing roller. Therefore the image forming apparatus has problems in that the constitution of the image forming apparatus becomes complex and the number of consumable supplies (parts) increases.

In addition, liquid developers have a drawback in that adhesion of colorants included in the liquid developers to receiving materials is not satisfactory, resulting in poor fixation of the images on the receiving materials.

In inkjet recording methods, an ink drop is discharged from a recording head toward a receiving material to record an image on the receiving material, wherein the ink typically penetrates into the receiving material (i.e., the receiving material absorbs the ink). Such inkjet recording methods have the following advantages:

(1) images can be recorded quietly (with low noise);
(2) color images can be recorded at a relatively high speed; and
(3) plain papers can be used as the receiving material.

Therefore, recently the inkjet recording methods have been well used for image forming apparatus such as printers and facsimile machines.

As the ink for use in such inkjet recording methods, oil-based inks in which an oil-soluble dye is dissolved in an oil solvent, and aqueous inks in which a water-soluble dye is dissolved in an aqueous solvent are well known. The oil-based inks typically have the following advantages:

(1) images can be recorded on various receiving materials;
(2) recorded images are quickly dried (images quickly penetrate into receiving materials and can be absorbed by the receiving materials);
(3) recorded images have good water resistance; and
(4) the chance of occurrence of a clogging problem, in which a nozzle is clogged with the dye included in the inkjet ink used, resulting in occurrence of image omissions, can be reduced.

However, even such oil-based inks have a drawback in that the oil solvent tends to evaporate in a nozzle, and thereby the oil-soluble dye solidifies or aggregates in the nozzle, resulting in occurrence of a clogging problem. In addition, such oil-based inks typically include a solvent having a high boiling point. When such a solvent having a high boiling point is used, images having a high image density cannot be obtained (i.e., high quality images cannot be obtained).

As the marker ink, inks in which an oil soluble dye or pigment is dissolved or dispersed in an organic solvent having a relatively low boiling point are well known. As the organic solvent, aromatic solvents such as toluene and xylene are typically used. However, recently odor and toxicity of such aromatic solvents present a problem. Therefore, recently solvents having relatively low toxicity, such as alcohols, etyleneglycol monoalkyl ethers (i.e., Cellosolves), and propyleneglycol monoalkyl ethers are typically used as the main solvent of quick-drying marker inks.

Such marker inks typically include an oil-soluble dye selected from dyes listed in Color Index. For example, dyes prepared by mixing a leuco dye of a basic dye with an organic acid; dyes prepared by preparing a salt by reacting a basic dye with an acidic dye or a fatty acid; or dyes prepared by changing an acidic dye into an amine salt thereof, are typically used. These techniques have been disclosed in Japanese Patent Publication No. 49-19175 (method for manufacturing dye ink for felt pen); JOP 62-174282 (oil-based ink); JOP 62-207377 (oil-based marking ink composition); JOP 63-75068 (alcohol-soluble dye composition); and JOP 64-87677 (marking ink composition). However, these inks are not satisfactory in view of odor, writing property, preservability, and safety of human being.

Electronic recording inks are used for forming character and photographic images by moving particles of an ink upon application of an electric field thereto, wherein the ink includes ink particles dispersed in an insulating liquid and is contained in a container prepared by a transparent paper such as cellophane. The ink particles are small in size and charged, and therefore they can be moved upon application of a certain voltage thereto. However, the images exhibited by conventional electronic recording inks have poor contrast, and in addition the response of the electronic recording inks to application of a voltage is unsatisfactory.

Non-aqueous paints typically include a solvent such as toluene and xylene, and therefore the paints have a drawback in view of safety of workers handling the paints. Currently, non-aqueous paints which use an isoparaffin solvent have been developed and used, but the paints have drawbacks in that the resultant films have poor gloss and water resistance.

Because of these reasons, a need exists for a liquid developer which can be used for electrophotographic image forming methods and which can produce (color) images having high image density, high resolution and good color reproducibility while the evaporation amount of the solvent used therein is decreased. In addition, a need exists for a printing ink, a maker ink, and a paint, which have good preservability and which can produce images or coated films having good gloss and water resistance without causing a blurring problem. Further, a need exists for an inkjet ink which can produce images having good gloss and water resistance without causing a blurring problem and which hardly causes a clogging problem. Furthermore a need exists for an electronic recording ink which can exhibit images having good contrast while making improved response.

SUMMARY OF THE INVENTION

Accordingly, an object of the present invention is to provide a liquid developer which can produce color images having high image density, high resolution and good color reproducibility while the evaporation amount of the solvent used therein is decreased.

Another object of the present invention is to provide an inkjet ink which has good preservability and which can produce images having high gloss and good water resistance without causing blurred images and a clogging problem.

Yet another object of the present invention is to provide an electronic recording ink which makes quick response and can exhibit high contrast images.

A further object of the present invention is to provide a printing ink and a marker ink which have good preservability and can produce images having good gloss and water resistance without causing a blurring problem.

A still further object of the present invention is to provide a paint which has good preservability and which can produce a film having good gloss and water resistance.

A still further object of the present invention is to provide an image forming method which uses a liquid developer and by which color images having high image density, high resolution and good color reproducibility can be produced while the evaporation amount of the solvent used therein is decreased.

To attain such objects, the present invention contemplates the provision of a recording liquid (i.e., a printing ink (e.g., a stencil ink), an inkjet ink, a marker ink, an electronic recording ink, a paint and a liquid developer) including a carrier liquid and a colorant dispersed in the carrier liquid, wherein the carrier liquid includes at least one of a liquid paraffin and a linear silicone oil. The carrier liquid preferably includes both a liquid paraffin and a linear silicone oil. Within the context of the present invention, the term "linear silicone oil" indicates a silicone polymer having a substantial linear backbone containing less than 0.5% of non-linear (cyclic or branched) units, more preferably less than 0.2% of non-linear units, still more preferably less than 0.1% non-linear units, most preferably no non-linear units.

The liquid developer and paint of the present invention further includes a resin. The silicone oil preferably has a flash point not lower than 210° C.

The liquid paraffin preferably has a flash point not lower than 130° C. and a viscosity not less than 3 mPa·s at 40° C.

The resin included in the liquid developer and paint preferably has a softening point of from 30 to 120° C. The resin is preferably a resin selected from the group consisting of ethylene-vinyl acetate copolymers, ethylene-acrylic acid copolymers and ethylene-acrylic ester copolymers.

The resin may be an epoxy resin having the following formula (1):

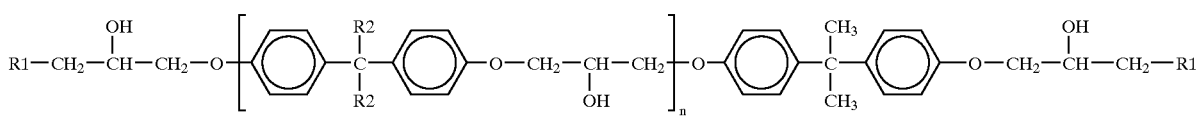

wherein n is an integer of from 1 to 25; R1 represents a group $—OOC_kH_{2k+1}$, wherein k is an integer of from 1 to 30; R2 represents a group $—C_mH_{2m+1}$, wherein m is an integer of from 1 to 30.

The weight average molecular weight of the resin is preferably from 800 to 10000.

The colorant is preferably subjected to a flushing treatment using a resin which is preferably selected from the group consisting of ethylene-vinyl acetate copolymers, ethylene-acrylic acid copolymers and ethylene-acrylic ester copolymers.

The ratio of the total weight of the resin and colorant to the total weight of the recording liquid is preferably not less than 10%.

The colorant (or toner) dispersed in the carrier liquid preferably has an average particle diameter of from 1 to 5 µm.

The recording liquid preferably has a viscosity not less than 10 mPa·s at 25° C.

In another aspect of the present invention, an image forming method is provided which includes the steps of:
  applying the above-mentioned recording liquid (i.e., liquid developer) on a liquid bearing member such as rollers and belts to form a thin layer of the recording liquid on the liquid bearing member; and
  developing an electrostatic latent image born on an image bearing member with the thin layer of the liquid developer to form a visual image on the image bearing member.

It is preferable that the image forming method further includes the step of subjecting the thin layer to corona-discharging before the developing step; and/or the step of applying a pre-wet liquid to at least the electrostatic latent image before the developing step. The pre-wet liquid is preferably the carrier liquid included in the liquid developer. The visual image is preferably transferred onto a receiving material via an intermediate transfer medium. The image bearing member is preferably a photoreceptor having both a water-repellant property and an oil-repellant property. The contact angle formed by the liquid developer and the photoreceptor having both a water-repellant property and an oil-repellant property is preferably not less than 30°.

These and other objects, features and advantages of the present invention will become apparent upon consideration of the following description of the preferred embodiments of the present invention taken in conjunction with the accompanying drawings.

DETAILED DESCRIPTION OF THE INVENTION

Figure 1:
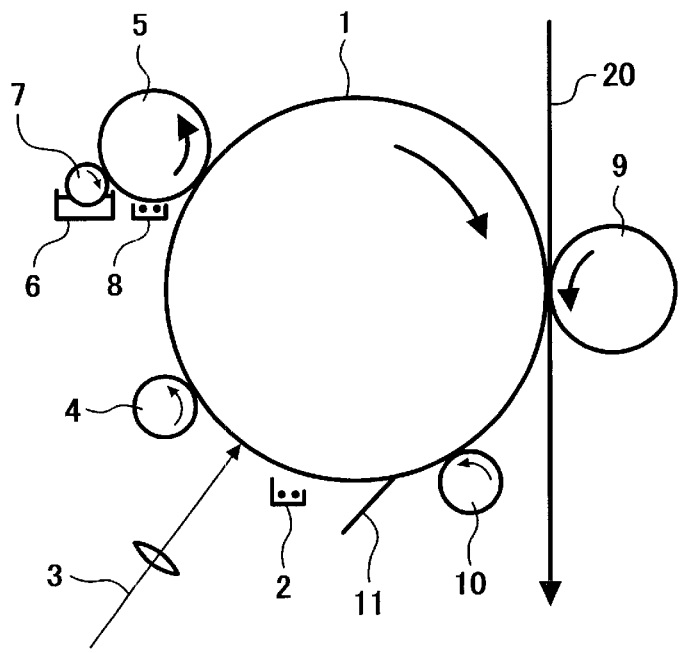
FIG. 1 is a schematic view illustrating an embodiment of the image forming apparatus for use in the image forming method of the present invention.

The recording liquid of the present invention will be explained in detail while mainly referring to a liquid developer for use in electrophotography, but the present invention relates to not only the liquid developer but also a printing ink (e.g., a stencil ink), a marker ink, a paint, an inkjet ink and an electronic recording ink (hereinafter these liquid developer, paint and inks are sometimes referred to as a recording liquid). The recording liquid of the present invention is characterized in that a liquid paraffin, a linear silicone oil or a combination of a liquid paraffin and a linear silicone oil is used alone or in combination with a conventional dispersion medium as the dispersion medium of the recording liquid.

Suitable liquid paraffins for use as the dispersion medium of the recording liquid include liquid paraffins having a flash point not lower than 130° C. and a viscosity not less than 3 mPa·s at 40° C. In particular, liquid paraffins having a flash point not lower than 160° C. and a viscosity from 5 to 500 mPa·s at 40° C. are more preferably used.

Specific examples of such liquid paraffins include CRYSTOL J-52, J-72, J-102, J-142, J-172, J-202, J-262, J-322 and J-352; and ESSO WHITE OIL M-52, M-72, M-82, M-172 and M-352, which are manufactured by Esso Sekiyu K. K.

Specific examples of the silicone oil which has a flash point not lower than 210° C. and preferably not lower than 300° C. include KF96 having a viscosity of from 20 to 10,000 cst (manufactured by Shin-Etsu Silicone Co., Ltd.; SH344 (manufactured by Toray Silicone Industries, Inc.; and TSF 451 series, TSF 404 (ring dimethylpolysiloxane) and TSF 4704 (amino-modified silicone), which are manufactured by Toshiba Silicone Co., Ltd.

When a liquid paraffin and a silicone oil are mixed, the ratio (P/S) of the liquid paraffin (P) to the silicone oil (S) in the recording liquid is 50/50 to 100/0 by weight, and preferably 70/30 to 95/5 by weight. In this case, the silicone oil is preferably a linear silicone oil. When the content of the liquid paraffin is too low, a problem in that a pigment cannot be well dispersed in the dispersion medium, resulting in deterioration of dispersion efficiency of the recording liquid and deterioration of resolution and color reproducibility of the resultant images tends to occur. In contrast, when the content of the liquid paraffin is too high, an offset problem in that the resultant images adhere to a fixing roller tends to occur.

Specific examples of the colorant include known inorganic pigments such as PRINTEX V, U and G, and SPECIAL BLACK 4, and 4-B which are manufactured by Degussa; #44, #30, MR-11 and MA-100 which are manufactured by Mitsubishi Kasei Corporation; RARBEN 1035 and 1252, and NEWSPECT H which are manufactured Columbian Carbon Co.; and LEGAL 400 and 660, and BLACK PEARL 900, 1100 and 1300, and MOGAL L which are manufactured by Cabot Corp.; and know organic pigments such as Phthalocyanine Blue, Phthalocyanine Green, Sky Blue, Rhodamine Lake, Malachite Green Lake, Methyl Violet Lake, Peacock Blue Lake, Naphthol Green B, Naphthol Green Y, Naphthol Yellow S, Naphthol Red, Lithol Fast Yellow 2G, Parmanent Red 4R, Brilliant Fast Scarlet, Hansa Yellow, Benzidine Yellow, Lithol Red, Lake Red C, Lake Red D, Brilliant Carmine 6B, Permanent Red F5R, Pigment Scarlet 3B, indigo, Thioindigo Oil Pink, and Bordeaux 10B.

In particular, when the pigments which are prepared by subjecting these pigments to a flushing treatment are used for a liquid developer, the liquid developer can produce images having good image qualities. The flushing treatment is typically performed as follows:

(1) a dye is dissolved or dispersed in water to prepare a solution or dispersion;

(2) a resin solution or dispersion is added to the dye solution and they are mixed in a kneader (i.e., a flusher) to replace water surrounding the dye with the resin solution;

(3) the replaced water is discharged to prepare a dispersion in which the dye is dispersed in the resin solution;

(4) the solvent is removed from the dispersion to prepare a mixture bulk of the dye and resin; and (5) the mixture bulk is pulverized to prepare a colorant powder.

The resin for use in the flushing treatment is preferably a resin having a softening point of from 30 to 120° C. in view of the fixability of the resultant toner and the preservability of the resultant liquid developer. Specific examples of such resins include SANWAX E200 (having a softening point of 95° C.) and 131-P (having a softening point of 108° C.) which are manufactured by Sanyo Chemical Industries Ltd.; AC POLYETHYLENE 1702 (having a softening point of 85° C.) and 430 (having a softening point of 60° C.) which are manufactured by Allied Chemical Corp.; and BR-95 (having a softening point of 80° C.) and 101 (having a softening point of 50° C.) which are manufactured by Mitsubishi Rayon Co., Ltd.

In particular, ethylene-vinyl acetate copolymers (which are manufactured by Mitsui-Du Pont Polychemical Co., Ltd.) are preferably used as the flushing resin. In addition, ethylene-acrylic acid copolymers and ethylene-acrylic ester copolymers can also be preferably used as the flushing resin.

The liquid developer includes a resin as a binder resin or a resin dispersing the colorant included therein. Specific examples of such a resin include polyolefins, acrylic resins, rosin-modified resins, styrene-butadiene resins, epoxy resins, polyester resins, natural resins, paraffin waxes and other resins.

Copolymers and graft copolymers including units formed of one or more vinyl monomers having the formula (A) described below; one or more vinyl monomers having the formula (B) described below; and one or more monomers selected from the group consisting of vinyl pyridine, vinyl pyrrolidone, ethyleneglycol dimethacrylate, styrene, divinyl benzene and vinyl toluene can also be used alone or in combination with one or more of the resins mentioned above as the binder resin or dispersing resin.

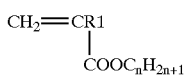
(A)

wherein R1 represents a hydrogen atom or a methyl group; and n is an integer of from 6 to 20.

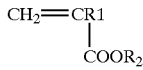
(B)

wherein R1 represents a hydrogen atom or a methyl group; and R2 represents —H, —$C_nH_{2n+1}$ (n is an integer of from 1 to 5), —$C_2H_4OH$, or —$C_2H_4N$ ($C_mH_{2m+1}$) (m is an integer of from 1 to 4).

In order to improve dispersibility of these resins in silicone oils, a silicon compound having an acryloyl group, such as LS4080 manufactured by Shin-Etsu Silicone Co., Ltd., may be copolymerized when the resins are prepared. In addition, AK-5 manufactured by Toagosei Co., Ltd., and TM0701, FM0711, FM0721 and FM0725 can also be used as the silicone compound.

When a silicone oil is included in the liquid developer, an offset problem in that a toner image formed on a receiving material adheres to a fixing roller and the image is re-transferred on a different area of the copy sheet or the following receiving material can be prevented. However, adhesion (fixation) of toner images on receiving materials tends to deteriorate.

In order to prevent such a problem, an epoxy-modified resin having the following formula (1) is preferably included in the liquid developer of the present invention.

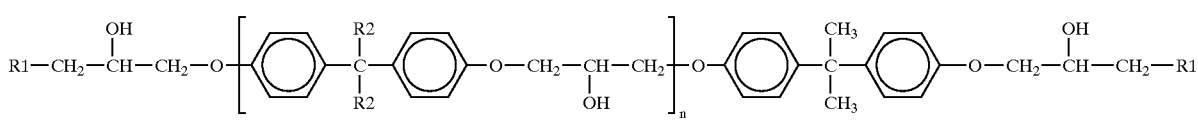
(1)

wherein n is an integer of from 1 to 25; R1 represents a group —$OOC_kH_{2k+1}$, wherein k is an integer of from 1 to 30; and R2 represents a group —$C_mH_{2m+1}$, wherein m is an integer of from 1 to 30.

The liquid developer including an epoxy-modified resin having formula (1) can prevent the hot-offset problem. In addition, such an epoxy-modified resin can be preferably used for liquid developers including a dispersion medium such as aliphatic hydrocarbons, fatty acid esters, liquid paraffins and vegetable oils.

Specific examples of the epoxy-modified resins are shown in Table 1 (resin examples (1) to (10)).

TABLE 1

|  | N | k | M |
| --- | --- | --- | --- |
| Resin Ex. (1) | 1 | 1 | 1 |
| Resin Ex. (2) | 2 | 2 | 1 |
| Resin Ex. (3) | 3 | 3 | 2 |
| Resin Ex. (4) | 4 | 4 | 2 |
| Resin Ex. (5) | 7 | 5 | 4 |
| Resin Ex. (6) | 10 | 6 | 5 |
| Resin Ex. (7) | 2 | 8 | 9 |
| Resin Ex. (8) | 12 | 18 | 20 |

TABLE 1-continued

|  | N | k | M |
| --- | --- | --- | --- |
| Resin Ex. (9) | 16 | 12 | 21 |
| Resin Ex. (10) | 20 | 25 | 16 |

The epoxy-modified resins are also preferably used as the flushing resin. In this case, the epoxy-modified resins can be used alone or in combination with a resin such as polyolefins, acrylic resins, rosin-modified resins and styrene-butadiene resins.

The liquid developer of the present invention is prepared, for example, by the following method:

(1) mixing a colorant and a resin (a binder resin or a dispersing resin);
(2) dispersing the mixture in a liquid paraffin using a dispersing machine such as attritors, ball mills, KITTY MILLS, disc mills and PIN MILLS to prepare a concentrated toner; and
(3) optionally diluting the concentrated toner with a silicone oil such that the solid content of the toner is decreased to ⅕ to ¹⁄₁₀ to prepare a liquid developer.

When the concentrated toner is prepared, a charge controlling agent such as metal soaps, lecithin, linseed oil, and higher fatty acids can be added if desired.

The liquid developer preferably has a viscosity not less than 10 mPa·s, and more preferably from 20 to 1000 mPa·s, at 25° C. The viscosity is measured by a B type viscometer while the rotor is rotated at a revolution of 60 rpm. When the viscosity is too low, a thin liquid layer cannot be formed on a liquid bearing member such as rollers or belts.

The content of total of the colorant and resin in the liquid developer is preferably not less than 10% by weight, and more preferably from 15 to 30% by weight based on total weight of the liquid developer. When the content is too low, a problem in that the resultant images have low image density tends to occur. The ratio (R/C) of the resin (R) to colorant (C) is preferably from 5/5 to 9/1.

The toner particles dispersed in the liquid developer of the present invention preferably have an average particle diameter of from 0.1 to 10 μm, and more preferably from 1 to 5 μm. When the average particle diameter is too small, the resultant images have low image density. In contrast, when the average particle diameter is too large, the resultant images have low resolution.

The carrier liquid of the liquid developer of the present invention preferably includes a silicone oil, and more preferably a linear silicone oil. By including a linear silicone oil in the liquid developer, the amount of the evaporated carrier liquid can be decreased when images are fixed. To use a linear silicone oil in the liquid developer prevents a problem in that the vapor of the carrier liquid deteriorates electrical connections of the image forming apparatus due to adhesion of the carrier liquid thereto.

Silicone oils are typically prepared by the following processes:

(1) a mixture powder of a silicon metal and a copper catalyst is reacted with a halogenated hydrocarbon such as methyl chloride at a temperature of from 250 to 500° C. to prepare an organo-silane, wherein the reaction formula is as follows:

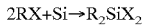

wherein R represents an organic group such as a methyl group or a phenyl group; and X represents a halogen atom;

(2) the organo-silane is reacted with water to prepare a silanol compound and then the silanol compound is condensed, wherein the reaction formula is as follows:

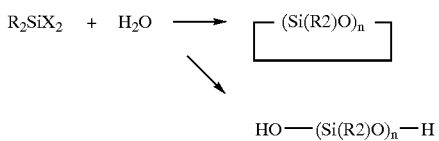

wherein n is an integer not less than 3;

(3) the reaction product is subjected to a thermo-cracking treatment using an alkali metal followed by a distillation treatment to prepare the ring compound (a) having a high purity; and (4) the ring compound is polymerized (if it is desired to prepare a linear polymer, the ring compound (a) is subjected to a ring opening treatment using an alkali catalyst and then the linear compound (b) is polymerized).

However, all the ring compounds cannot be opened, i.e., a small amount of the ring compounds remain. The ring silicone compounds have a higher volatility than the linear silicone compounds. Therefore when a ring silicone is used for a liquid developer, a problem in that electrical connections of image forming apparatus are deteriorated tends to occur.

Therefore, recently a method in which a chlorosilane is directly reacted with methanol to prepare a siloxane bonding has been developed and used to prepare linear silicone oils. In the liquid developer of the present invention, the linear silicone oils can be preferably used to avoid the connection problem mentioned above.

Specific examples of the linear silicone oils include silicone oils manufactured by WACKER ASAHIKASEI SILICONE CO., LTD.

AKO.65, AK1, AK10, AK20, AK50, AK100, AK300, AK500, AK1000, AKF100, AKF300, AKF500, AKF1000, AR20, AR50, AR100, L031, L032, L066, L650, L653, WR300, WS62M, W23, IM11, IM15 and IM22.

The liquid developer of the present invention is preferably used for image forming methods in which an electrostatic latent image formed on an image bearing member such as photoreceptors is developed with a developer to form a visual image (i.e., a toner image) on the image bearing member, and the toner image is transferred onto a receiving material such as papers and plastic sheets and then fixed thereon.

In this image forming method, an electrostatic latent image is preferably developed with a thin layer of the liquid developer of the present invention formed on a roller or a belt. The thickness of the thin layer is preferably from 1 to 15 μm, and more preferably from 3 to 10 μm. When the thin layer is too thin, the resultant images have low image density. In contrast, when the thin layer is too thick, the resolution of the resultant images deteriorates.

When an electrostatic latent image is developed with a thin layer of the liquid developer, it is preferable that the thin layer is preliminarily subjected to a corona discharge treatment to improve the resolution of the resultant images. This is because co-fusion of the toner can be improved. In this case, the polarity of the corona discharging is preferably the same as that of the toner and the voltage is preferably from 500 to 8,000 V.

In addition, it is preferable that an electrostatic latent image is developed with a thin layer of the liquid developer after the electrostatic latent image area of the image bearing member is wet with a pre-wet liquid to produce high quality images by improving the transfer efficiency of the toner particles. The application of the pre-wet liquid is preferably performed by a roller or a method in which the pre-wet liquid is sprayed.

The pre-wet liquid is preferably a liquid which is the same kind as the carrier liquid used in the liquid developer. The pre-wet liquid preferably has a high electric resistance, a low dielectric constant and a low surface energy. Specific examples of the pre-wet liquid include silicone oils (e.g., KF-96 manufactured by Shin-Etsu Silicone Co., Ltd.), fluorine containing liquids (e.g., FLORINATE manufactured by Sumitomo-3M) and isoparaffin type solvents (e.g., ISOPAR manufactured by Exxon Mobile).

The thickness of the pre-wet liquid applied on the image bearing member is preferably from 0.1 to 5 μm, and more preferably from 0.3 to 1 μm. When the pre-wet liquid layer is too thin, image transfer efficiency can be hardly increased. In contrast, when the pre-wet liquid layer is too thick, the resolution of the resultant images deteriorates.

In the image forming method of the present invention, it is preferable that the toner images formed on the image bearing member are transferred onto an intermediate transfer medium, and then transferred onto a receiving material such as papers to produce high quality images even on a plain paper. This is because the toner images transferred on the intermediate transfer medium are transferred onto a receiving material while a pressure is applied to the intermediate transfer medium.

Suitable materials for use in the intermediate transfer medium include materials having good solvent resistance and elasticity such as urethane rubbers, nitrile rubbers, and hydrin rubbers. It is more preferable to coat the surface of the intermediate transfer medium with a fluorine-containing resin or the like material.

In addition, the surface of the image bearing member (e.g., a photoreceptor) is preferably water-repellant and oil-repellant such that the contact angle formed by the image bearing member and the liquid developer is not less than 30° to improve the transfer efficiency and cleaning property of the toner images, resulting in improvement of the image qualities of the resultant images. It is preferable to improve the water-repellant and oil-repellant property of the image bearing member by coating a fluorine-containing block polymer (e.g., MODIPER F200 and 210 manufactured by NOF Corporation) on the surface of the image bearing member.

Then the image forming method of the present invention will be explained in detail referring to figures.

FIG. 1 is a schematic view illustrating an embodiment of the image forming apparatus for use in the image forming method of the present invention.

In FIG. 1, numeral 1 is a photoreceptor which includes a photosensitive material such as organic photoconductors, selenium or amorphous silicon and which rotates in a direction as indicated by an arrow. A corona charger 2 charges the photoreceptor 1 while the photoreceptor 1 is rotated. Then imagewise light 3 irradiates the charged photoreceptor 1 to form an electrostatic latent image on the photoreceptor 1. A roller 4 applies a carrier liquid (i.e., a pre-wet liquid) to the surface of the photoreceptor 1 to preliminarily wet the photoreceptor 1. A toner roller 7 applies a liquid toner, which is contained in a toner container 6, on the surface of a developing roller 5. Thus a uniform liquid toner layer is formed on the developing roller 5. The toner layer on the developing roller is charged by a corona charger 8, if desired. The electrostatic latent image formed on the photoreceptor 1 is developed with the toner on the developing roller 5, resulting in formation of a visual image (i.e., a toner image) on the photoreceptor 1.

As the rollers 4, 5 and 7, any known rollers such as metal rollers, plastic rollers and sponge rollers can be used. In addition, wire bars and gravure rolls which have grooves on the surface thereof can also be used as the rollers 4, 5 and 7.

The toner image formed on the photoreceptor 1 is transferred on a receiving material 20 by a transfer roller 9. Toner image transferring is performed upon application of pressure, corona charging, heat, a combination of heat with pressure, a combination of corona charging with pressure, a combination of corona charging with heat or the like.

Around the surface of the photoreceptor 1, a cleaning roller 10 and a cleaning blade 11 are arranged to remove toner remaining on the surface of the photoreceptor 1 after the toner image is transferred.

Figure 5:
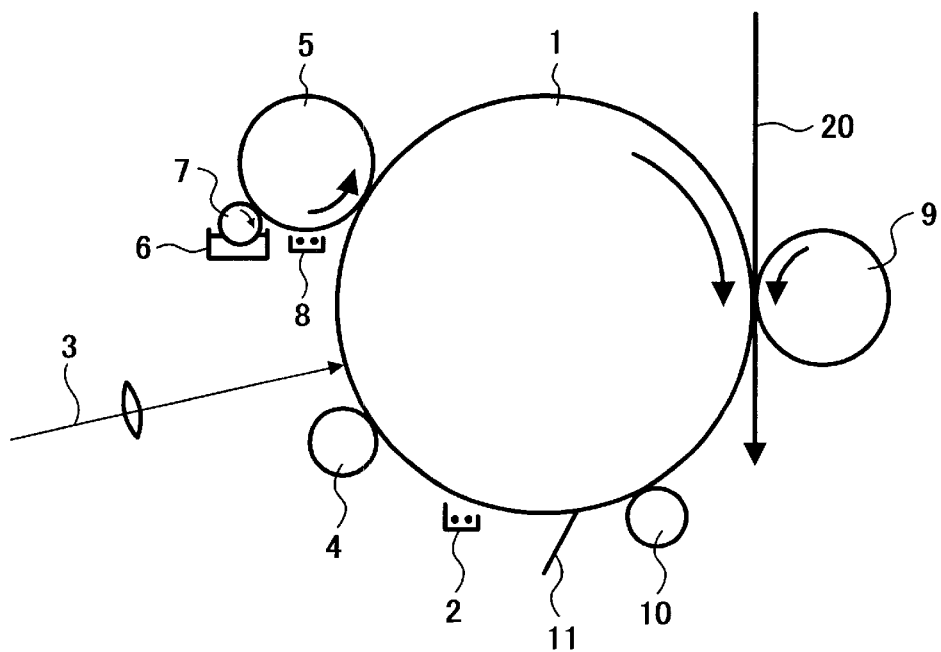
FIGS. 5 to 8 are schematic views illustrating still further embodiments of the image forming apparatus for use in the image forming method of the present invention.

FIG. 5 illustrates another embodiment of the image forming apparatus for use in the image forming method of the present invention. The difference between this embodiment and the embodiment as illustrated in FIG. 1 is that the pre-wet roller 4 is arranged so as to wet the photoreceptor 1 after the imagewise light 3 irradiates the photoreceptor.

Figure 2:
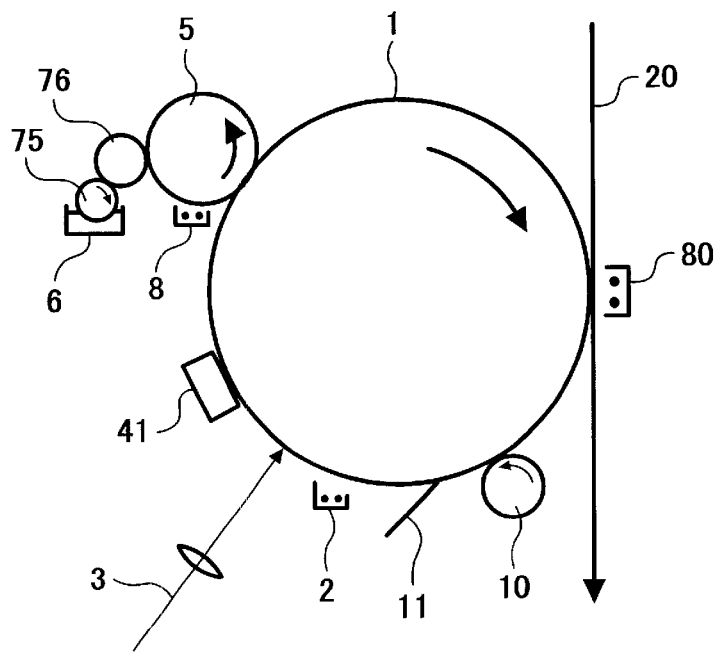
FIG. 2 is a schematic view illustrating another embodiment of the image forming apparatus for use in the image forming method of the present invention.

FIG. 2 is a schematic view illustrating yet another embodiment of the image forming apparatus for use in the image forming method of the present invention. The differences between the image forming apparatus as shown in FIG. 2 and the image forming apparatus as shown in FIG. 1 are as follows:

The pre-wet liquid is coated on the surface of the photoreceptor 1 by a felt 41 instead of the pre-wet roller 4. The liquid developer is transferred from the toner container 6 to the developing roller 5 via rollers 75 and 76. By providing the rollers 75 and 76, the quantity (thickness) of the liquid developer layer on the developing roller 5 can be severely controlled. In addition, in the image forming apparatus as shown in FIG. 2 the contact area between the developing roller 5 and the photoreceptor 1 is longer than that in the image forming apparatus as shown in FIG. 1 to sufficiently develop the electrostatic latent image. Further, a corona charger 80 is used as the image transfer device instead of the transfer roller 9.

Figure 6:
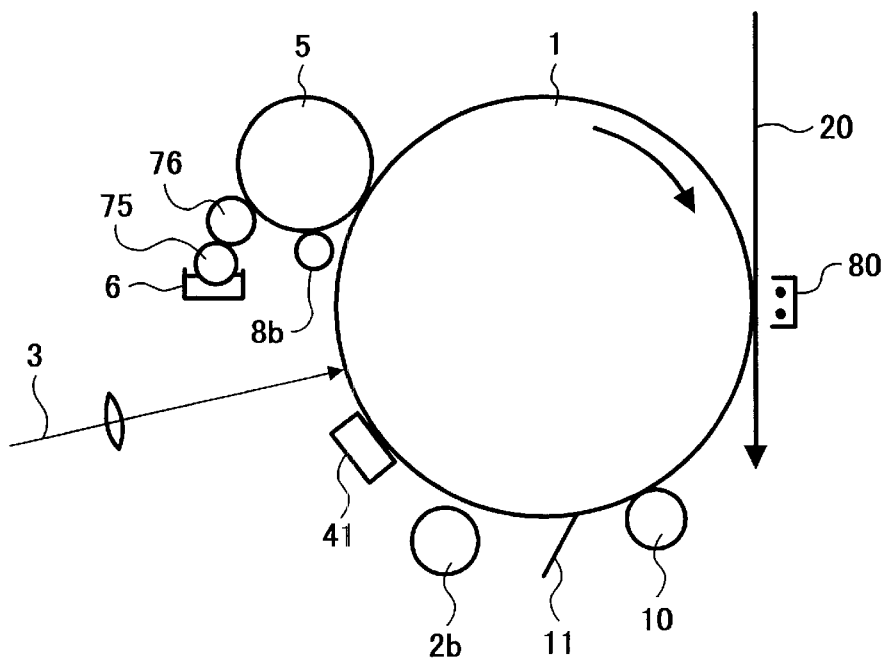

As shown in FIG. 6, the felt 41 may be arranged so as to pre-wet the photoreceptor 1 before the imagewise light irradiates the photoreceptor 1. In addition, the charger 8 may be replaced with a charging roller 8b. Further, the charger 2 may be replaced with a charging roller 2b.

Figure 3:
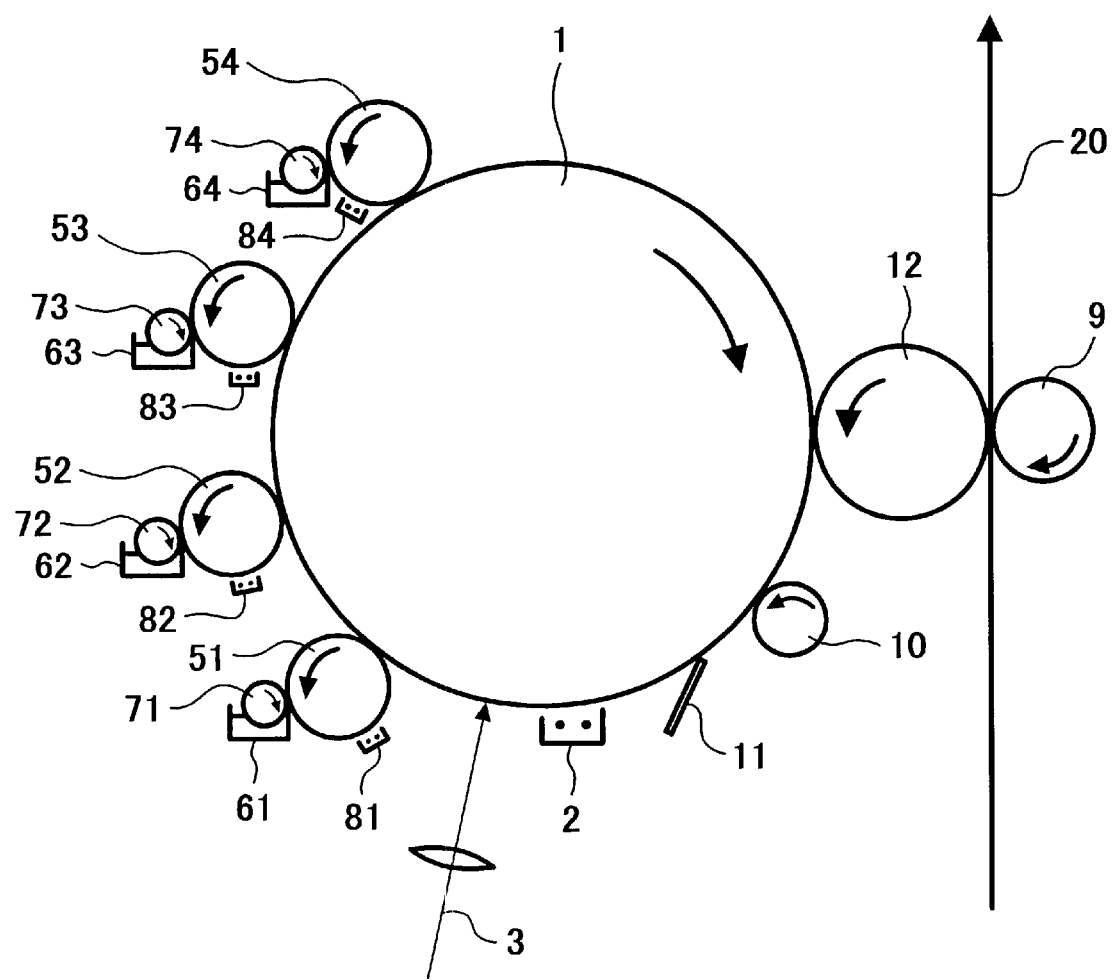
FIG. 3 is a schematic view illustrating yet another embodiment of the image forming apparatus for use in the image forming method of the present invention.

FIG. 3 is a schematic view illustrating a further embodiment of the image forming apparatus which can be used in the image forming method of the present invention and which produces color images. The image forming apparatus has toner containers 61, 62, 63 and 64 for yellow, magenta, cyan and black color liquid developers. The color liquid developers are transferred from the containers 61, 62, 63 and 64 by toner rollers 71, 72, 73 and 74, respectively. Thus, yellow, magenta, cyan and black color liquid developer layers are formed on developing rollers 51, 52, 53 and 54. At first an electrostatic latent image is developed with, for example, a yellow color toner, which is formed on the developing roller 51. Thus, a yellow toner image is formed on the photoreceptor 1. The yellow toner image is transferred on an intermediate transfer roller 12. The yellow toner image is then transferred on a receiving material 20 while the receiving material 20 is pressed by a transfer roller 9 toward the intermediate transfer roller 12. The toner image may be transferred upon application of corona charging or heat instead of pressure. Then an electrostatic latent image for a magenta image is formed on the photoreceptor 1, and is developed with the magenta developer layer, which is formed on he developing roller 52. Thus, a magenta toner image is formed on the photoreceptor 1. The magenta toner image is then transferred onto the proper position of the receiving material 20 via the intermediate transfer roller 12.

Similarly, a cyan toner image and a black toner image are also formed on the proper position of the receiving material 20 via the intermediate transfer roller 12.

Numeral 81 to 84 denote a corona charger configured to charge the developer layers formed on the developing rollers 51 to 54.

Figure 7:
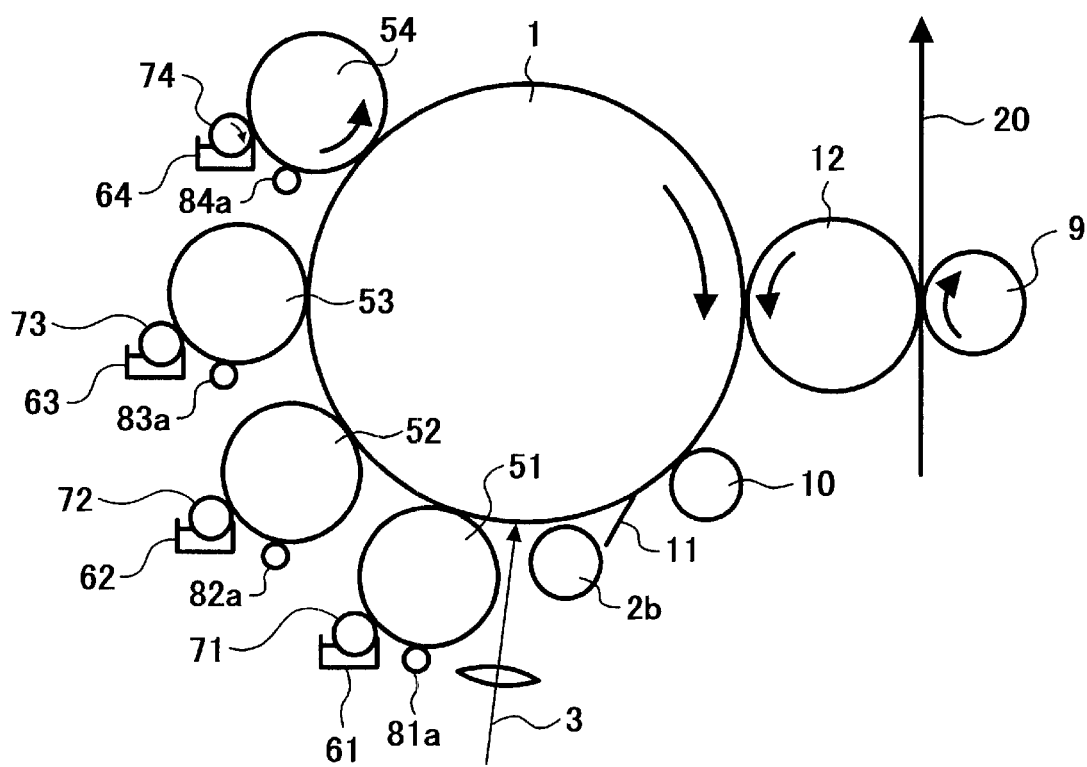

As illustrated in FIG. 7, the corona charger 2 may be replaced with a charging roller 2b. In addition, the corona chargers 81 to 84 may be replaced with charging rollers 81a to 84a.

Figure 4:
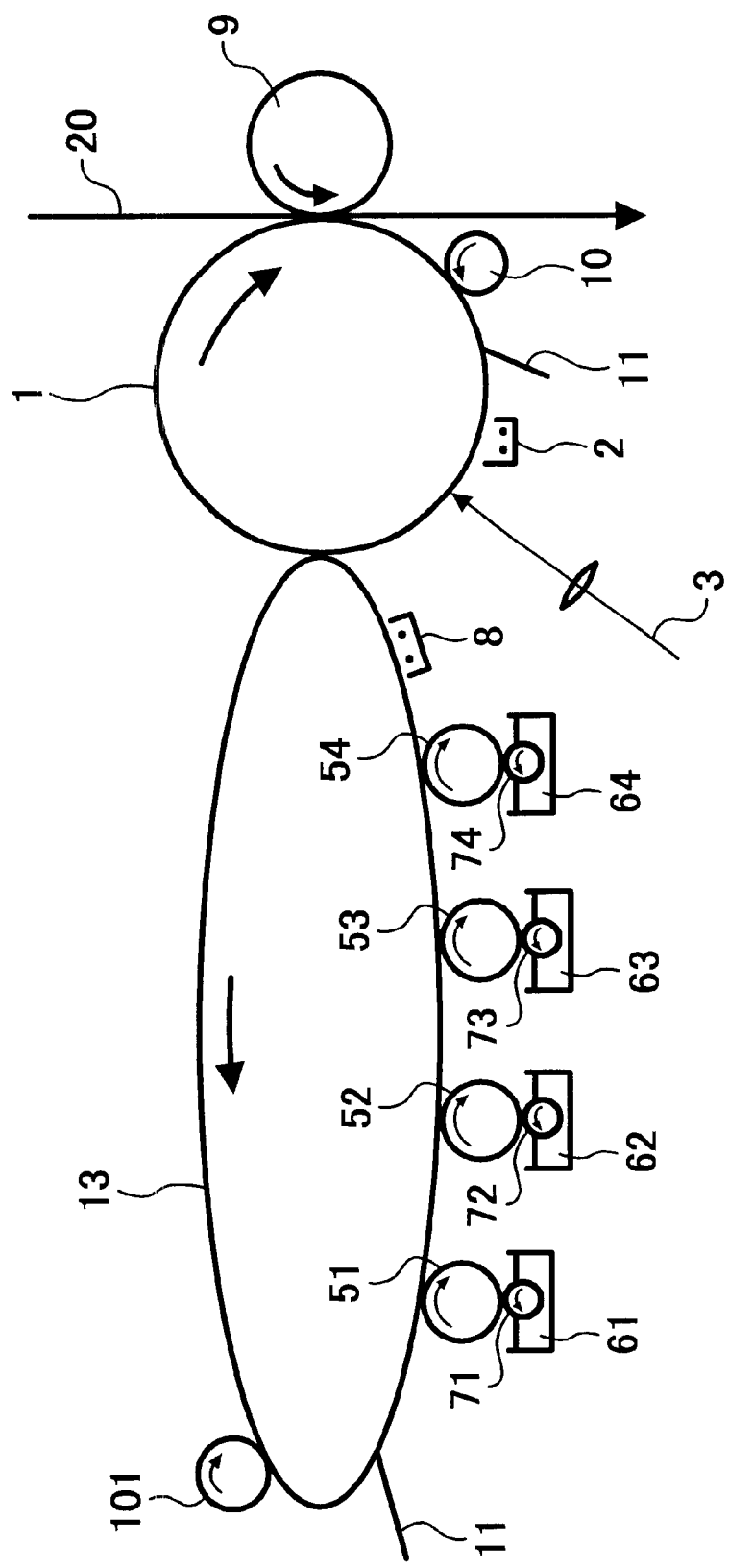
FIG. 4 is a schematic view illustrating a further embodiment of the image forming apparatus for use in the image forming method of the present invention.

FIG. 4 is a schematic view illustrating a still further embodiment of the image forming apparatus which can be used in the image forming method of the present invention and which produces color images. The image forming apparatus has toner containers 61, 62, 63 and 64 each of which contains a yellow liquid developer, a magenta liquid developer, a cyan liquid developer or a black liquid developer. Each developer is applied to a belt 13 from each of the toner containers 61, 62, 63 and 64 via toner rollers 71 to 74 and developer rollers 51 to 54, to form a yellow toner image, a magenta toner image, a cyan toner image and a black toner image, one by one, on the photoreceptor 1. The yellow, magenta, cyan and black images are transferred onto a receiving material 20 one by one. Numeral 101 denotes a cleaning roller configured to clean the surface of the belt 13.

Figure 8:
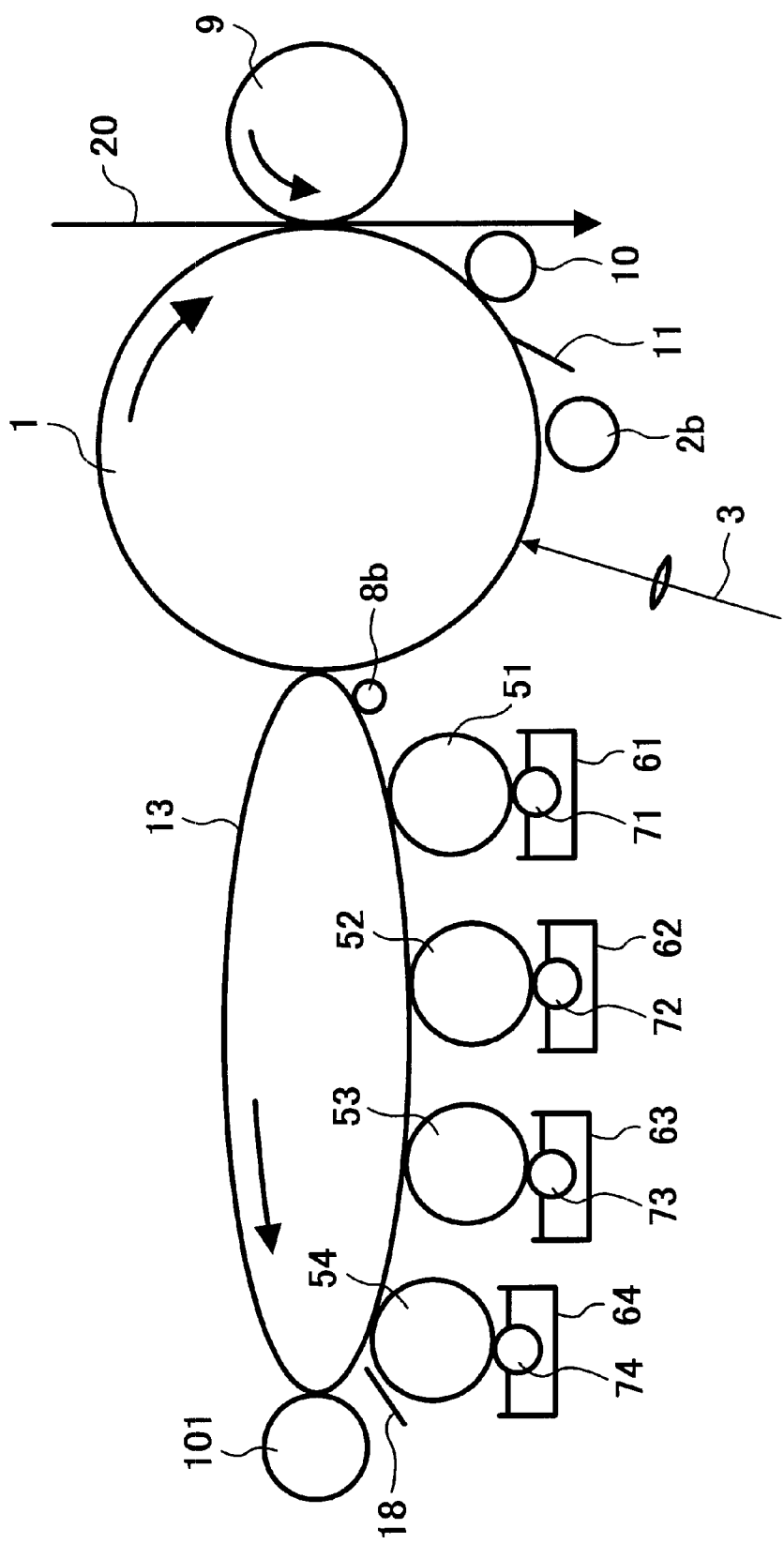

As illustrated in FIG. 8, the corona charger 2 may be replaced with a charging roller 2b and the corona charger 8 may be replaced with a charging roller 8b.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following components were mixed and dispersed for 24 hours using a ball mill.

| | |
|---|---|
| Carbon black | 20 |
| (Manufactured by Cabot Corporation) | |
| Rosin-modified phenolic resin varnish | 50 |
| Linseed oil varnish | 10 |
| Manganese naphthenate | 2 |
| Liquid paraffin | 50 |
| (CRYSTOL J-72) | |

In addition, 100 parts of the liquid paraffin (CRYSTOL J-72) were added to the mixture, and the mixture was additionally dispersed for 1 hour. Thus, a printing ink (i.e., a stencil ink) was prepared.

The printing ink was set in a printing machine (PRIPORT manufactured by Ricoh Co., Ltd.) to print images.

Example 2

The following components were mixed and dispersed for 24 hours using a ball mill.

| | |
|---|---|
| Carmine 6B | 10 |
| (manufactured by Fuji Shikiso Kogyo K.K.) | |
| Phenolic resin | 30 |
| Electroconductivity imparting agent | 2 |
| Liquid paraffin | 100 |
| (CRYSTOL J-52) | |

In addition, 100 parts of the liquid paraffin (CRYSTOL J-52) were added to the mixture, and the mixture was additionally dispersed for 1 hour. Thus, an inkjet ink was prepared.

The printing ink was set in an inkjet printer to print images.

Example 3

The following components were mixed and dispersed for 24 hours using a ball mill.

| | |
|---|---|
| Copper phthalocyanine | 20 |
| (Pigment Blue 15:3 manufactured by Dainichiseika Color & Chemical Mfg. Co., Ltd.) | |
| Vinyl chloride-vinyl acetate copolymer | 20 |
| Acrylic resin | 20 |
| Paraffin wax | 2 |
| Liquid paraffin | 50 |
| (CRYSTOL J-52) | |

In addition, 100 parts of the liquid paraffin (CRYSTOL J-52) were added to the mixture, and the mixture was additionally dispersed for 1 hour. Thus, a non-aqueous paint was prepared.

Example 4

The following components were mixed and dispersed for 24 hours using a ball mill.

| | |
|---|---|
| VALIFAST RED #1605 | 7 |
| (manufactured by Orient Chemical Industries Co., Ltd.) | |
| Ketone resin | 10 |
| Liquid paraffin | 80 |
| (CRYSTOL J-52) | |

In addition, 100 parts of the liquid paraffin (CRYSTOL J-52) were added to the mixture, and the mixture was additionally dispersed for 1 hour. Thus, a marker ink was prepared.

Example 5

The following components were mixed and dispersed for 24 hours using a ball mill.

| | |
|---|---|
| Carbon black | 10 |
| (manufactured by Mitsubishi Chemical Corp.) | |
| Titanium oxide | 10 |
| Charge controlling agent | 1 |
| Styrene-butadiene resin | 15 |
| Liquid paraffin | 50 |
| (CRYSTOL J-52) | |

In addition, 150 parts of the liquid paraffin (CRYSTOL J-52) were added to the mixture, and the mixture was additionally dispersed for 1 hour. Thus, an electronic recording ink was prepared.

The electronic recording ink was contained in a display cell to record images.

Comparative Example 1

The procedure for preparation of the printing ink in Example 1 was repeated except that the liquid paraffin was replaced with linseed oil.

Thus, a printing ink of Comparative Example 1 was prepared.

Comparative Example 2

The procedure for preparation of the inkjet ink in Example 2 was repeated except that the liquid paraffin was replaced with isododecane.

Thus, an inkjet ink of Comparative Example 2 was prepared.

Comparative Example 3

The procedure for preparation of the non-aqueous paint in Example 3 was repeated except that the liquid paraffin was replaced with toluene.

Thus, a non-aqueous paint of Comparative Example 3 was prepared.

Comparative Example 4

The procedure for preparation of the marker ink in Example 4 was repeated except that the liquid paraffin was replaced with ethyl alcohol.

Thus, a marker ink of Comparative Example 4 was prepared.

Comparative Example 5

The procedure for preparation of the electronic recording ink in Example 4 was repeated except that the liquid paraffin was replaced with n-hexane.

Thus, an electronic recording ink of Comparative Example 5 was prepared.

The evaluation results of these recording liquids of Examples 1 to 5 and Comparative Examples 1 to 5 are as follows:

(1) Comparison of Example 1 with Comparative Example 1

The images produced by the printing ink of Example 1 are superior to the images produced by the printing ink of Comparative Example 1 in image density, resolution and gloss.

(2) Comparison of Example 2 with Comparative Example 2

The images produced by the inkjet ink of Example 2 are superior to the images produced by the inkjet ink of Comparative Example 2 in image density and gloss. In addition, the inkjet ink of Example 2 is superior to the inkjet ink of Comparative Example 2 in clogging.

(3) Comparison of Example 3 with Comparative Example 3

The film formed by the paint of Example 3 is superior to that formed by the paint of Comparative Example 3 in gloss, preservability, light resistance and water resistance.

(4) Comparison of Example 4 with Comparative Example 4

The marker ink of Example 4 is superior to the marker ink of Comparative Example 4 in writing ability. Namely, the marker ink of Example 4 hardly causes a problem in that when images are continuously written by a marker pen, clear images cannot be recorded on the way of writing, which problem is typically caused by conventional marker inks.

(5) Comparison of Example 5 with Comparative Example 5

The electronic recording ink of Example 5 is superior to the electronic recording ink of Comparative Example 4 in response to application of a voltage and image qualities such as clearness and contrast.

In addition, the recording inks of Examples 1 to 5 had no odor, and in addition even when the inks adhered hands, there was no problem and the inks could be easily washed out.

Example 6

The following components were mixed and kneaded for 30 minutes at 140° C. using a two-roll mill.

| | |
|---|---|
| Polyethylene | 70 |
| (SANWAX 151P having a softening point of 107° C. and manufactured by Sanyo Chemical Industries Ltd.) | |
| Carbon black | 20 |
| (PRINTEX manufactured by Degussa) | |

The kneaded mixture was cooled and then pulverized.

The following components were mixed and dispersed for 24 hours using a ball mill.

| | |
|---|---|
| The pulverized mixture prepared above | 50 |
| 20% liquid paraffin solution of a copolymer | 100 |
| (liquid paraffin: CRYSTOL J-72; copolymer: lauryl methacrylate/methyl methacryalte/methacrylic acid/glycidyl methacrylate = 80/10/5/5) | |
| CRYSTOL J-102 | 200 |

Three hundred (300) parts of a silicone oil (AK-50 having a viscosity of 50 cst and manufactured by WACKER ASAHIKASEI SILICONE CO., LTD.) were added to the mixture and the mixture was further dispersed for 1 hour using a ball mill. Thus, a liquid developer of Example 6 was prepared.

Example 7

The following components were mixed and kneaded at 120° C. using a kneader.

| | |
|---|---|
| Pigment Blue 15:3 | 15 |
| (manufactured by Dainichiseika Color & Chemical Mfg. Co., Ltd.) | |
| Polyethylene | 90 |
| (SANWAX E300 having a softening point of 98° C. and manufactured by Sanyo Chemical Industries Ltd.) | |

The kneaded mixture was subjected to a flushing treatment using a flusher and then pulverized.

The following components were mixed and dispersed for 36 hours using a ball mill.

| | |
|---|---|
| The pulverized mixture prepared above | 60 |
| 10% liquid paraffin solution of a copolymer | 150 |
| (liquid paraffin: CRYSTOL J-142; copolymer: stearyl methacrylate/methyl methacryalte/methacrylic acid/hydroxymethyl methacrylate = 85/7/4/4) | |
| CRYSTOL J-202 | 150 |

Then 250 parts of a silicone oil (KF-96 having a viscosity of 100 cst and manufactured by Shin-Etsu Chemical Co., Ltd.) were added to the mixture and the mixture was further dispersed for 1 hour using a ball mill. Thus, a liquid developer of Example 7 was prepared.

Example 8

The following components were mixed and kneaded for 30 minutes at 80° C. using a two-roll mill.

| | |
|---|---|
| Pigment Red 57:1 | 20 |
| (manufactured by Fuji Shikiso Kogyo K. K.) | |
| Poly-n-butyl methacrylate | 75 |
| (BR-102 having a softening point of 20° C.) | |

The kneaded mixture was cooled and then pulverized.

The following components were mixed and dispersed for 24 hours using a ball mill.

| | |
|---|---|
| The pulverized mixture prepared above | 50 |
| 20% liquid paraffin solution of a copolymer (liquid paraffin: CRYSTOL J-52; copolymer: lauryl methacrylate/glycidyl methacrylate = 80/20) | 100 |
| CRYSTOL J-52 | 300 |

Then 100 parts of a liquid paraffin (CRYSTOL J-52) were added to the mixture and the mixture was further dispersed for 1 hour using a ball mill. Thus, a liquid developer of Example 8 was prepared.

Comparative Example 6

The procedure for preparation of the liquid developer of Example 6 was repeated except that the liquid paraffin (CRYSTOL J-102) was replaced with a silicone oil (KF-96 having a viscosity of 100 cst). Thus, a liquid developer of Comparative Example 6 was prepared.

Comparative Example 7

The procedure for preparation of the liquid developer of Example 6 was repeated except that the liquid paraffin (CRYSTOL J-202) was replaced with an isoparaffin solvent (ISOPAR H manufactured by Exxon Mobil). Thus, a liquid developer of Comparative Example 7 was prepared.

Comparative Example 8

The procedure for preparation of the liquid developer of Example 6 was repeated except that the liquid paraffin (CRYSTOL J-52) was replaced with a silicone oil (KF-96 having a viscosity of 50 cst). Thus, a liquid developer of Comparative Example 8 was prepared.

Each of the liquid developers of Examples 6 to 8 and Comparative Examples 6 to 8 was set in an image forming apparatus having a heat fixing device and images were formed while the image forming conditions were controlled such that the image qualities were optimized. The data of the image qualities (i.e., image density, resolution, sharpness, solid image uniformity, and color reproducibility), transfer ratio of toner images, and offset resistance as shown in Table 2 were the data obtained under the most suitable recording conditions.

The evaluation items and methods are as follows:

(1) Image density (ID)

The image density of the images formed on a plain paper (T-6000 from Ricoh Co., Ltd.) was measured by a densitometer manufactured by X-Rite.

(2) Resolution

Fine line images of the images formed on the plain paper T-6000 were observed to determine the resolution of the line images. The unit is lines per mm.

(3) Sharpness

The sharpness of the images formed on the plain paper T-6000 was evaluated while classified into the following 5 grades:

Rank 5: excellent

Rank 4: good

Rank 3: fair

Rank 2: bad

Rank 1: seriously bad (4) Uniformity of solid image

The uniformity of the solid images formed on the plain paper T-6000 was evaluated while classified into the following 5 grades:

Rank 5: excellent

Rank 4: good

Rank 3: fair

Rank 2: bad

Rank 1: seriously bad (5) Color reproducibility ($\Delta E$)

The color images formed on a special art paper (OK SPECIAL ART) were evaluated with respect to color tone using a color difference meter manufactured by X-Rite to obtain $\Delta E$ when compared to the color listed in Japan Color. When $\Delta E$ was determined, $L^*$ was not taken into consideration. This is because $L^*$ largely varies depending on the image density of the image to be measured.

(6) Average particle diameter (D)

The average particle diameter of the toner in each liquid developer was measured by an instrument SA-CP3 manufactured by Shimadzu Corporation.

(7) Transfer ratio

Provided that the weight of a toner image formed on the image bearing member is (T) and the weight of the toner image which is formed by transferring the toner image on the image bearing member onto the receiving material is (T'), the transfer ratio is represented as (T')/(T). Each developer was evaluated with respect to the transfer ratio.

(8) Offset resistance

The images recorded on the plain paper T-6000 were observed whether an offset problem occurred. The quality of the images with respect to offset resistance was classified into the following 5 grades:

Rank 5: excellent

Rank 4: good

Rank 3: fair

Rank 2: bad

Rank 1: seriously bad

TABLE 2

| | ID | Resolution (l/mm) | Sharpness | Uniformity | $\Delta E$ | D ($\mu$m) | T'/T (%) | Offset resistance |
|---|---|---|---|---|---|---|---|---|
| Ex. 6 | 1.32 | 7.1 | 4 | 4 | 1.3 | 0.81 | 95 | 5 |
| Ex. 7 | 1.47 | 7.1 | 5 | 4.5 | 3.9 | 1.19 | 95 | 5 |
| Ex. 8 | 1.38 | 7.1 | 4 | 4 | 2.5 | 0.82 | 94 | 4 |
| Comp. Ex. 6 | 1.18 | 6.3 | 3 | 3 | 1.8 | 3.52 | 94 | 5 |
| Comp. Ex. 7 | 1.26 | 6.3 | 3 | 3 | 6.7 | 2.20 | 94 | 3 |
| Comp. Ex. 8 | 1.15 | 6.3 | 3 | 3 | 7.7 | 3.62 | 94 | 4 |

Example 9

The procedures for preparation and evaluation of the liquid developer in Example 6 were repeated except that images were formed using an image forming apparatus having such a constitution as shown in FIG. 2 in which the corona charger 2 applied a voltage of 3,000 V to the developer layer formed on the developing roller 5 such that the developer layer was subjected to corona discharging, before the image developing process.

As can be understood from Table 3 below, the resolution of the images is improved.

TABLE 3

|  | ID | Resolution (l/mm) | Sharpness | Uniformity | ⊿E | D ($\mu$m) | T'/T (%) | Offset resistance |
|---|---|---|---|---|---|---|---|---|
| Ex. 9 | 1.33 | 8.0 | 4 | 4 | 1.3 | — | 95 | 5 |

Example 10

The procedures for preparation and evaluation of the liquid developer in Example 7 were repeated except that images were formed using an image forming apparatushaving such a constitution as shown in FIG. 2 in which a silicone oil KF-96 having a viscosity of 300 cst was applied to the surface of the photoreceptor by the pre-wet felt 41 such that the silicone oil layer was formed thereon in a thickness of about 0.5 $\mu$m, before the image developing process.

As can be understood from Table 4 below, the image density (ID) and transfer ratio (T/T) of the images are improved.

TABLE 4

|  | ID | Resolution (l/mm) | Sharpness | Uniformity | ⊿E | D ($\mu$m) | T'/T (%) | Offset resistance |
|---|---|---|---|---|---|---|---|---|
| Ex. 10 | 1.54 | 7.1 | 5 | 4.5 | 3.9 | — | 98 | 5 |

Example 11

The procedures for preparation and evaluation of the liquid developer in Example 7 were repeated except that images were formed using an image forming apparatus having such a constitution as shown in FIG. 3 in which a drum which is made of a urethane rubber having a surface treated with a fluorine-containing material is used as the intermediate transfer roller 12.

As can be understood from Table 5 below, the image density (ID) and transfer ratio (T/T) of the images are improved.

TABLE 5

|  | ID | Resolution (l/mm) | Sharpness | Uniformity | ⊿E | D ($\mu$m) | T'/T (%) | Offset resistance |
|---|---|---|---|---|---|---|---|---|
| Ex. 11 | 1.58 | 7.1 | 5 | 4.5 | 3.9 | — | 98 | 5 |

Example 12

The procedures for preparation and evaluation of the liquid developer in Example 7 were repeated except that images were formed using an image forming apparatus having such a constitution as shown in FIG. 4 in which a fluorine-containing acrylic block copolymer (MODIPER F210 manufactured by NOF Corporation) was applied to the surface of the photoreceptor to form a water- and oil-repellant layer having a thickness of 3 μm. The contact angle formed by the surface of the photoreceptor and the liquid developer was 45°.

As can be understood from Table 6 below, the image density (ID) and transfer ratio (T'/T) of the images are improved.

| Carbon black (PRINTEX V manufactured by Degussa) | 300 |
| Resin example (8) described above in Table 1 | 500 |
| Ammonium fumate | 25 |
| Water | 150 |

TABLE 6

| | ID | Resolution (l/mm) | Sharpness | Uniformity | ΔE | D (μm) | T'/T (%) | Offset resistance |
|---|---|---|---|---|---|---|---|---|
| Ex. 12 | 1.60 | 7.1 | 5 | 4.5 | 3.9 | — | 99 | 5 |

Colorant Manufacturing Example 1

The following components were contained in a gallon kneader to prepare an aqueous solution.

| Water | 200 |
| Ammonium fumate | 20 |

Then 250 parts of carbon black (#44 manufactured by Mitsubishi Chemical Corp.) were added to the solution, and the mixture was dispersed by the kneader.

The mixture was further mixed with 750 parts of the resin example (3) having the formula described above in Table 1 and the mixture was then heated to about 100° C. to separate water from the mixture. The mixture was further kneaded at 120° C. for 4 hours, and then vacuum-dried. Then the mixture was cooled and pulverized to prepare a flushed colorant (1).

Colorant Manufacturing Example 2

The following components were contained in a gallon kneader to prepare an aqueous solution.

| Water | 200 |
| Animonium fumate | 10 |

Then 250 parts of carbon black (MOGAL A manufactured by Columbian Carbon Co.) were added to the solution, and the mixture was dispersed by the kneader.

The mixture was further mixed with 300 parts of the resin example (5) having the formula described above in Table 1 and then the mixture was heated to about 150° C. to separate water from the mixture. The mixture was further kneaded at 120° C. for 4 hours, and then vacuum-dried. Then the mixture was cooled and pulverized to prepare a flushed colorant (2).

Colorant Manufacturing Example 3

The procedure for preparation of the flushed colorant (1) was repeated except that the formulation was changed to the following:

Thus a flushed colorant (3) was prepared.

Example 13

The following components were mixed and dispersed for 24 hours using a ball mill.

| Flushed colorant (1) prepared above | 60 |
| 20% silicone oil solution of a copolymer (silicone oil: KF-96 having a viscosity of 10 cst and manufactured by Shin-Etsu Silicone Co., Ltd.; copolymer: steary methacrylate/methyl methacryalte/methacrylic acid/glycidyl methacrylate = 80/10/5/5) | 100 |
| Silicone oil (KF-96 having a viscosity of 100 cst and manufactured by Shin-Etsu Silicone Co., Ltd.) | 200 |

Then 300 parts of the silicone oil (KF-96 having a viscosity of 100 cst) were added to the mixture and further dispersed for more 1 hour. Thus a concentrated toner was prepared.

Then 200 parts of the thus prepared concentrated toner were diluted with the silicone oil (KF-96 having a viscosity of 100 cst). Thus a liquid developer of Example 13 was prepared.

Example 14

The procedure for preparation of the liquid developer in Example 13 was repeated except that the formulation of the liquid developer was changed to the following.

| Flushed colorant (2) prepared above | 50 |
| 10% isoparaffin solution of a copolymer (isoparaffin: ISOPAR H manufactured by Exxon Mobil; copolymer: lauryl methacrylate/ethyl methacryalte/acrylic acid/hydroxy methacrylate = 85/7/4/4) | 200 |
| Refined safflower oil | 100 |

Thus a liquid developer of Example 14 was prepared.

Example 15

The procedure for preparation of the liquid developer in Example 13 was repeated except that the formulation of the liquid developer was changed to the following.

| | | | | | |
|---|---|---|---|---|---|
| Flushed colorant (3) prepared above | | | | | 60 |
| 10% solution of a copolymer (dispersion medium: isopropyl myristate; copolymer: stearyl methacrylate/methyl methacryalte/methacrylic acid/glycidyl methacrylate = 80/10/5/5) | | | | | 200 |
| Isopropyl myristate | | | | | 100 |

Thus a liquid developer of Example 15 was prepared.

Comparative Example 9

The procedure for preparation of the liquid developer in Example 13 was repeated except that the resin (the resin example (3)) of the flushed colorant (1) was replaced with a rosin-modified maleic acid resin.

Thus, a liquid developer of Comparative Example 9 was prepared.

Comparative Example 10

The procedure for preparation of the liquid developer in Example 13 was repeated except that the resin (the resin example (3)) of the flushed colorant (1) was replaced with a rosin-modified phenolic resin.

Thus, a liquid developer of Comparative Example 10 was prepared.

Comparative Example 11

The procedure for preparation of the liquid developer in Example 13 was repeated except that the resin (the resin example (3)) of the flushed colorant (1) was replaced with a polyester resin.

Thus, a liquid developer of Comparative Example 11 was prepared.

The liquid developers of Examples 13 to 19 and Comparative Examples 9 to 11 were evaluated in the same way as performed in Example 1 except that the image forming apparatus was changed to an image forming apparatus having such a configuration as shown in FIG. 5 and a fixing device having a heat roller.

The results are shown in Table 7.

Example 16

The procedures for preparation and evaluated of the liquid developer in Example 13 was repeated except that images were formed using an image forming apparatus having such a constitution as shown in FIG. 6 in which the charging roller 2b applied a voltage of 2,000 V to the developer layer formed on the developing roller such that the developer layer was subjected to corona discharging, before the image developing process.

As can be understood from Table 7 below, the resolution of the images is improved.

Example 17

The procedures for preparation and evaluation of the liquid developer in Example 14 were repeated except that images were formed using an image forming apparatus having such a constitution as shown in FIG. 6 in which a silicone oil KF-96 having a viscosity of 300 cst was applied to the surface of the photoreceptor by the pre-wet felt 41 such that the silicone oil layer was formed thereon in a thickness of about 0.5 $\mu$m, before the image developing process.

As can be understood from Table 7 below, the image density (ID) and transfer ratio (T/T) of the images are improved.

Example 18

The procedures for preparation and evaluation of the liquid developer in Example 15 were repeated except that images were formed using an image forming apparatus having such a constitution as shown in FIG. 7 in which a drum which is made of a urethane rubber having a surface treated with a fluorine-containing material is formed is used as the intermediate transfer roller 12.

As can be understood from Table 7 below, the image density (ID) and transfer ratio (T/T) of the images are improved.

Example 19

The procedures for preparation and evaluation of the liquid developer in Example 15 were repeated except that images were formed using an image forming apparatus having such a constitution as shown in FIG. 8 in which a fluorine-containing acrylic block copolymer (MODIPER F210 manufactured by NOF Corporation) was applied to the surface of the photoreceptor to form a water- and oil-repellant layer having a thickness of 2 $\mu$m. The contact angle formed by the surface of the photoreceptor and the liquid developer was 45°.

As can be understood from Table 7 below, the image density (ID) and transfer ratio (T/T) of the images are improved.

TABLE 7

| | ID | Resolution (line/mm) | Sharpness | T/T (%) | Offset resistance |
|---|---|---|---|---|---|
| Ex. 13 | 1.38 | 8.3 | 4 | 95 | 5 |
| Ex. 14 | 1.36 | 8.3 | 4 | 94 | 5 |
| Ex. 15 | 1.40 | 8.3 | 4 | 95 | 5 |
| Comp. Ex. 9 | 1.25 | 6.3 | 3 | 93 | 2 |
| Comp. Ex. 10 | 1.18 | 6.3 | 2 | 93 | 2 |
| Comp. Ex. 11 | 1.30 | 5.6 | 3 | 91 | 2 |
| Ex. 16 | 1.40 | 9.3 | 5 | 93 | 5 |
| Ex. 17 | 1.46 | 9.1 | 5 | 99 | 5 |
| Ex. 18 | 1.40 | 8.0 | 5 | 99 | 5 |
| Ex. 19 | 1.43 | 6.8 | 5 | 99 | 5 |

Example 20

When the liquid developer of Example 14 was used as a printing ink, the resultant print images had high gloss and good fixability.

Example 21

When the liquid developer of Example 13 was used as an inkjet ink, the ink had good discharging properties and the resultant images had high image density.

Example 22

When the liquid developer of Example 14 was used as a paint, the resultant coating layer had good adhesion and high gloss.

Example 23

When the liquid developer of Example 15 was used as a marker ink, the resultant images had high image density and good coloring property.

Example 24

The following components were mixed and dispersed for 24 hours using a ball mill.

| | |
|---|---|
| Carbon black | 20 |
| (manufactured by Cabot Corporation) | |
| Rosin-modified phenolic resin varnish | 50 |
| Linseed oil varnish | 10 |
| Manganese naphthenate | 2 |
| Silicone oil | 50 |
| (AK-50 manufactured by WACKER ASAHIKASEI SILICONE CO., LTD. and including no ring silicone, i.e., a linear silicone oil) | |

Then 100 parts of the silicone oil (AK-50) were added to the mixture and the mixture was further dispersed for 1 hour. Thus a printing ink (i.e., stencil ink) was prepared.

The printing ink was set in a printing machine (PRIPORT manufactured by Ricoh Co., Ltd.) to print images.

Example 25

The following components were mixed and dispersed for 24 hours using a ball mill.

| | |
|---|---|
| Carmine 6B | 10 |
| (manufactured by Fuji Shikiso Kogyo K. K.) | |
| Phenolic resin | 30 |
| Electroconductivity imparting agent | 2 |
| Silicone oil | 100 |
| (AK0.65 manufactured by WACKER ASAHIKASEI SILICONE CO., LTD.) | |

In addition, 100 parts of the silicone oil (AK0.65) were added to the mixture, and the mixture was additionally dispersed for 1 hour. Thus, an inkjet ink was prepared.

The printing ink was set in an inkjet printer to print images.

Example 26

The following components were mixed and dispersed for 24 hours using a ball mill.

| | |
|---|---|
| Copper phthalocyanine | 20 |
| (Pigment Blue 15:3 manufactured by Dainichiseika Color & Chemical Mfg. Co., Ltd.) | |
| Vinyl chloride-vinyl acetate copolymer | 20 |
| Acrylic resin | 20 |
| Paraffin wax | 2 |
| Silicone oil | 50 |
| (AK20 manufactured by WACKER ASAHIKASEI SILICONE CO., LTD.) | |

In addition, 100 parts of the silicone oil (AK20) were added to the mixture, and the mixture was additionally dispersed for 1 hour. Thus, a non-aqueous paint was prepared.

Example 27

The following components were mixed and dispersed for 24 hours using a ball mill.

| | |
|---|---|
| VALIFAST RED #1605 | 7 |
| (manufactured by Orient Chemical Industries Co., Ltd.) | |
| Ketone resin | 10 |
| (HILAC 110H manufactured by Hitachi Chemical Co., Ltd.) | |
| Silicone oil | 80 |
| (AK10 manufactured by WACKER ASAHIKASEI SILICONE CO., LTD.) | |

In addition, 100 parts of the liquid paraffin (AK10) were added to the mixture, and the mixture was additionally dispersed for 1 hour. Thus, a marker ink was prepared.

Example 28

The following components were mixed and dispersed for 24 hours using a ball mill.

| | |
|---|---|
| Carbon black | 10 |
| (manufactured by Mitsubishi Chemical Corp.) | |
| Titanium oxide | 10 |
| Charge controlling agent | 1 |
| Styrene-butadiene resin | 15 |
| Silicone oil | 50 |
| (AK0.65 manufactured by WACKER ASAHIKASEI SILICONE CO., LTD.) | |

In addition, 150 parts of the silicone oil (AK0.65) were added to the mixture, and the mixture was additionally dispersed for 1 hour. Thus, an electronic recording ink was prepared.

The electronic recording ink was contained in a display cell to record images.

Comparative Example 12

The procedure for preparation of the printing ink in Example 1 was repeated except that the silicone oil was replaced with linseed oil.

Thus, a printing ink of Comparative Example 12 was prepared.

Comparative Example 13

The procedure for preparation of the inkjet ink in Example 25 was repeated except that the linear silicone oil was replaced with another silicone oil (KF-96 having a viscosity of 0.65 cst and manufactured by Shin-Etsu Silicone Co., Ltd.).

Thus, an inkjet ink of Comparative Example 13 was prepared.

Comparative Example 14

The procedure for preparation of the non-aqueous paint in Example 26 was repeated except that the linear silicone oil was replaced with toluene.

Thus, a non-aqueous paint of Comparative Example 14 was prepared.

Comparative Example 15

The procedure for preparation of the marker ink in Example 27 was repeated except that the linear silicone oil was replaced with ethyl alcohol.

Thus, a marker ink of Comparative Example 15 was prepared.

Comparative Example 16

The procedure for preparation of the electronic recording ink in Example 28 was repeated except that the liquid paraffin was replaced with n-hexane.

Thus, an electronic recording ink of Comparative Example 16 was prepared.

The evaluation results of these recording liquids of Examples 24 to 28 and Comparative Examples 12 to 16 are as follows:

(1) Comparison of Example 24 with Comparative Example 12

The images produced by the printing ink of Example 24 are superior to the images produced by the printing ink of Comparative Example 12 in image density, resolution and gloss.

(2) Comparison of Example 25 with Comparative Example 13

The images produced by the inkjet ink of Example 25 are superior to the images produced by the inkjet ink of Comparative Example 13 in image density and gloss. In addition, the inkjet ink of Example 25 is superior to the inkjet ink of Comparative Example 13 in clogging.

(3) Comparison of Example 26 with Comparative Example 14

The film formed by the paint of Example 26 is superior to that formed by the paint of Comparative Example 14 in gloss, preservability, light resistance and water resistance.

(4) Comparison of Example 27 with Comparative Example 15

The marker ink of Example 27 is superior to the marker ink of Comparative Example 15 in writing ability. Namely, the marker ink of Example 27 hardly causes a problem in that when images are continuously written by a marker pen, clear images cannot be recorded on the way of writing, which problem is typically caused by conventional marker inks.

(5) Comparison of Example 28 with Comparative Example 16

The electronic recording ink of Example 28 is superior to the electronic recording ink of Comparative Example 16 in response to application of a voltage and image qualities such as clearness and contrast.

In addition, when the inkjet ink of Comparative Example 13 was used for continuously printing images for 50 hours, a problem concerning electric contact occurred. However, the inkjet ink of Example 25 did not cause such a problem even when the ink was subjected to the 50-hour running test.

In addition, the recording liquids of Examples 24 to 28 had no odor, and in addition even when the inks adhered hands, there was no problem and the inks could be easily washed out.

Example 29

The following components were mixed and kneaded for 30 minutes at 140° C. using a two-roll mill.

| | |
|---|---|
| Polyethylene | 70 |
| (SANWAX 151P having a softening point of 107° C. and manufactured by Sanyo Chemical Industries Ltd.) | |
| Carbon black | 20 |
| (PRINTEX manufactured by Degussa) | |

The kneaded mixture was cooled and then pulverized.

The following components were mixed and dispersed for 24 hours using a ball mill.

| | |
|---|---|
| The pulverized mixture prepared above | 50 |
| 20% silicone oil solution of a copolymer | 100 |
| (silicone oil: AR-20; copolymer: lauryl methacrylate/methyl methacryalte/methacrylic acid/glycidyl methacrylate = 80/10/5/5) | |
| Silicone oil | 200 |
| (AR20 manufactured by WACKER ASAHIKASEI SILICONE CO., LTD) | |

Then 300 parts of a silicone oil (KF-96 having a viscosity of 50 cst and manufactured by Shin-Etsu Chemical Co., Ltd.) were added to the mixture and the mixture was further dispersed for 1 hour using a ball mill. Thus, a liquid developer of Example 29 was prepared.

Example 30

The following components were mixed and kneaded at 120° C. using a kneader.

| | |
|---|---|
| Pigment Blue 15:3 | 15 |
| (manufactured by Dainichiseika Color & Chemical Mfg. Co., Ltd.) | |
| Polyethylene | 90 |
| (SANWAX E300 having a softening point of 98° C. and manufactured by Sanyo Chemical Industries Ltd.) | |

The kneaded mixture was subjected to a flushing treatment and then pulverized.

The following components were mixed and dispersed for 36 hours using a ball mill.

| | |
|---|---|
| The pulverized mixture prepared above | 60 |
| 10% silicone oil solution of a copolymer | 150 |
| (silicone oil: AR10; copolymer: stearyl methacrylate/methyl methacryalte/methacrylic acid/hydroxymethyl methacrylate = 85/7/4/4) | |
| Silicone oil | 150 |
| (AR10 manufactured by WACKER ASAHIKASEI SILICONE CO., LTD.) | |

Example 31

The following components were mixed and kneaded for 30 minutes at 80° C. using a two-roll mill.

| | |
|---|---|
| Pigment Red 57:1 | 20 |
| (manufactured by Fuji Shikiso Kogyo K.K.) | |
| Poly-n-butyl methacrylate | 75 |
| (BR-102 having a softening point of 20° C. and manufactured by Mitsubishi Rayon Co., Ltd.) | |

The kneaded mixture was cooled and then pulverized.

The following components were mixed and dispersed for 24 hours using a ball mill.

| | |
|---|---|
| The pulverized mixture prepared above | 50 |
| 20% silicone oil solution of a copolymer | 100 |
| (silicone oil: AR10; copolymer: lauryl methacrylate/glycidyl methacrylate = 80/20) | |
| silicone oil | 300 |

Then 100 parts of the silicone oil (AR10) were added to the mixture and the mixture was further dispersed for 1 hour using a ball mill. Thus, a liquid developer of Example 31 was prepared.

Comparative Example 17

The procedure for preparation of the liquid developer of Example 29 was repeated except that the silicone oil (AR20) was replaced with a silicone oil (KF-96 having a viscosity of 20 cst). Thus, a liquid developer of Comparative Example 17 was prepared.

Comparative Example 18

The procedure for preparation of the liquid developer of Example 30 was repeated except that the silicone oil (R10) was replaced with an isoparaffin solvent (ISOPAR H manufactured by Exxon Mobil). Thus, a liquid developer of Comparative Example 18 was prepared.

Comparative Example 19

The procedure for preparation of the liquid developer of Example 31 was repeated except that the silicone oil (AR10) was replaced with a silicone oil (KF-96 having a viscosity of 10 cst). Thus, a liquid developer of Comparative Example 19 was prepared.

Each of the liquid developers of Examples 29 to 31 and Comparative Examples 17 to 19 was set in an image forming apparatus having a constitution as shown in FIG. 5 and an oil-less heat fixing device, and images were formed while the image forming conditions were controlled such that the image qualities were optimized. The data of the image qualities (i.e., image density, resolution, sharpness, solid image uniformity, and color reproducibility), transfer ratio of toner images, and offset resistance as shown in Table 8 were the data obtained under the most suitable recording conditions.

The evaluation items and methods are the same as those mentioned above in Example 1.

TABLE 8

| | ID | Resolution (l/mm) | Sharpness | Uniformity | $\Delta E$ | D ($\mu$m) | T/T (%) | Offset resistance |
|---|---|---|---|---|---|---|---|---|
| Ex. 29 | 1.31 | 7.1 | 4 | 4 | 1.4 | 0.83 | 95 | 5 |
| Ex. 30 | 1.46 | 7.1 | 5 | 4.5 | 3.8 | 1.16 | 95 | 5 |
| Ex. 31 | 1.37 | 7.1 | 4 | 4 | 2.4 | 0.80 | 94 | 4 |
| Comp. Ex. 17 | 1.17 | 6.3 | 3 | 3 | 1.7 | 3.50 | 94 | 5 |
| Comp. Ex. 18 | 1.25 | 6.3 | 3 | 3 | 6.6 | 2.25 | 94 | 3 |
| Comp. Ex. 19 | 1.14 | 6.3 | 3 | 3 | 7.6 | 3.60 | 94 | 4 |

Since the developer of Example 30 includes a flushed colorant, the image density and uniformity of the images produced by the developer of Example 30 are better than those of the images produced by the developer of Example 29. Since the developer of Example 31 includes a resin having a softening point lower than 30° C., the offset resistance is slightly worse than those of the developer of Examples 29 and 30.

When compared with the developers of Comparative Examples 17 to 19, the image qualities such as image density, resolution, sharpness, uniformity and color reproducibility of the images produced by the developers of Examples 29 to 31 are superior to those of the images produced by the developers of Comparative Examples 17 to 19. In addition, the developers of Examples 29 to 31 have wide fixable temperature range and hardly cause the offset problem.

When the developers of Examples 29 to 31 were subjected to a 50-hour running test, the electric connection problem did not occur, whereas the developers of Comparative Examples 17 and 19 caused the electric connection problem in the running test, and thereby the operations of the image forming apparatus were stopped.

Example 32

The procedures for preparation and evaluation of the liquid developer in Example 29 was repeated except that images were formed using an image forming apparatus having such a constitution as shown in FIG. 6 in which the charger 8b applied a voltage of 3,000 V to the developer layer formed on the developing roller 5 such that the developer layer was subjected to corona discharging, before the image developing process.

As can be understood from Table 9 below, the resolution of the images is improved.

TABLE 9

|  | ID | Resolution (l/mm) | Sharpness | Uniformity | ⊿E | D (μm) | T/T (%) | Offset resistance |
|---|---|---|---|---|---|---|---|---|
| Ex. 32 | 1.33 | 8.0 | 4 | 4 | 1.3 | — | 95 | 5 |

Example 33

The procedures for preparation and evaluation of the liquid developer in Example 30 was repeated except that images were formed using an image forming apparatus having such a constitution as shown in FIG. 6 in which a silicone oil KF-96 having a viscosity of 300 cst was applied to the surface of the photoreceptor 1 by a pre-wet felt 41 such that the silicone oil layer was formed thereon in a thickness of about 0.5 μm, before the image developing process.

As can be understood from Table 10 below, the image density (ID) and transfer ratio (T/T) of the images are improved.

TABLE 10

|  | ID | Resolution (l/mm) | Sharpness | Uniformity | ⊿E | D (μm) | T/T (%) | Offset resistance |
|---|---|---|---|---|---|---|---|---|
| Ex. 33 | 1.54 | 7.1 | 5 | 4.5 | 3.9 | — | 98 | 5 |

Example 34

The procedures for preparation and evaluation of the liquid developer in Example 30 was repeated except that images were formed using an image forming apparatus having such a constitution as shown in FIG. 7 in which a drum which is made of a urethane rubber having a surface treated with a fluorine-containing material is used as the intermediate transfer roller 12.

As can be understood from Table 11 below, the image density (ID) and transfer ratio (T/T) of the images are improved.

TABLE 11

|  | ID | Resolution (l/mm) | Sharpness | Uniformity | ⊿E | D (μm) | T/T (%) | Offset resistance |
|---|---|---|---|---|---|---|---|---|
| Ex. 34 | 1.58 | 7.1 | 5 | 4.5 | 3.9 | — | 98 | 5 |

Example 35

The procedures for preparation and evaluation of the liquid developer in Example 30 was repeated except that images were formed using an image forming apparatus having such a constitution as shown in FIG. 8 in which a fluorine-containing acrylic block copolymer (MODIPER F210 manufactured by NOF Corporation) was applied to the surface of the photoreceptor 1 to form a water- and oil-repellant layer having a thickness of 3 μm. The contact angle formed by the surface of the photoreceptor and the liquid developer was 45°.

As can be understood from Table 12 below, the image density (ID) and transfer ratio (T'/T) of the images are improved.

TABLE 12

|  | ID | Resolution (l/mm) | Sharpness | Uniformity | ΔE | D (μm) | T'/T (%) | Offset resistance |
|---|---|---|---|---|---|---|---|---|
| Ex. 35 | 1.60 | 7.1 | 5 | 4.5 | 3.9 | — | 99 | 5 |

Additional modifications and variations of the present invention are possible in light of the above teachings. It is therefore to be understood that within the scope of the appended claims the invention may be practiced other than as specifically described herein.

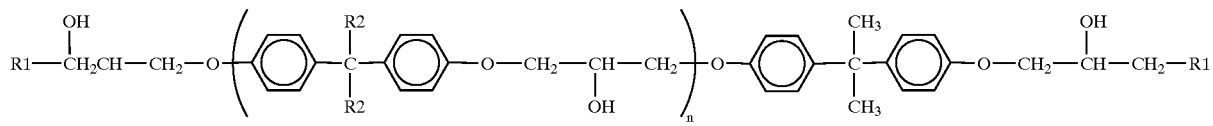

(1)

This document claims priority and contains subject matter related to Japanese Patent Applications Nos. 2001-187937, 2001-163266 and 2001-205347, filed on Jun. 21, 2001, May 30, 2001 and Jul. 5, 2001, respectively, the entire contents of which are herein incorporated by reference.

What is claimed as new and desired to be secured by Letters Patent of the United States is:

1. A recording liquid, comprising:

a colorant; and a carrier liquid;

wherein the carrier liquid comprises a member selected from the group consisting of liquid paraffins, linear silicone oils and mixtures thereof;

wherein the liquid paraffin has a flash point not lower than 130° C. and a viscosity not lower than 3 mPa·sec;

wherein said mixtures comprise a ratio of said liquid paraffin to said linear silicone oil of from 50/50 to 100/0 by weight.

2. The recording liquid according to claim 1, wherein the carrier liquid comprises both a liquid paraffin and a linear silicone oil.

3. The recording liquid according to claim 1, wherein the recording liquid is an inkjet ink, a printing ink, a marker ink, or an electronic recording ink.

4. The recording liquid according to claim 1, wherein the recording liquid is a non-aqueous paint or a liquid developer, and wherein the recording liquid further comprises a first resin.

5. The recording liquid according to claim 4, wherein the first resin has a softening point of from 30 to 120° C.

6. The recording liquid according to claim 4, wherein the first resin comprises a resin selected from the group consisting of ethylene-vinyl acetate copolymers, ethylene-acrylic acid copolymers and ethylene-acrylic ester copolymers.

7. The recording liquid according to claim 4, wherein the colorant comprises a coloring compound and a second resin, and wherein the second resin is the same as or different from the first resin.

8. The recording liquid according to claim 7, the recording liquid being a liquid developer, wherein the second resin comprises an epoxy-modified resin having the following formula (1):

wherein n is an integer of from 1 to 25; R1 represents a group $-OOC_kH_{2k+1}$, wherein k is an integer of from 1 to 30; and R2 represents a group $-C_mH_{2m+1}$, wherein m is an integer of from 1 to 30.

9. The recording liquid according to claim 7, wherein the second resin has a weight average molecular weight of from 800 to 10,000.

10. The recording liquid according to claim 7, wherein the colorant has been subjected to a flushing treatment.

11. The recording liquid according to claim 4, wherein the colorant and first resin are included in the recording liquid in an amount not less than 10% by weight based on total weight of the recording liquid.

12. The recording liquid according to claim 1, wherein the carrier liquid comprises a linear silicone oil having a flash point not lower than 210° C.

13. The recording liquid according to claim 1, wherein the colorant has an average particle diameter of from 1 to 5 μm.

14. The recording liquid according to claim 1, wherein the recording liquid has a viscosity not less than 10 mPa·s at 25° C.

15. An image forming method, comprising:

applying a recording liquid on a liquid bearing member to form a layer of the recording liquid;

wherein the recording liquid comprises a colorant, a resin and a carrier liquid comprising a member selected from the group consisting of liquid paraffins, linear silicone oils and mixtures thereof;

wherein the liquid paraffin has a flash point not lower than 130° C. and a viscosity not lower than 3 mPa·sec;

wherein said mixtures comprise a ratio of said liquid paraffin to said linear silicone oil of from 50/50 to 101/0 by weight; and developing an electrostatic latent image born on an image bearing member by bringing the layer of the recording liquid into contact with the image bearing member to form a visual image on the image bearing member.

16. The image forming method according to claim 15, further comprising:

charging the layer of the recording liquid before the developing step.

17. The image forming method according to claim 15, further comprising:

wetting the image bearing member with a pre-wet liquid before the developing step.

18. The image forming method according to claim 17, wherein the pre-wet liquid is the carrier liquid.

19. The image forming method according to claim 15, further comprising:

transferring the visual image on an intermediate transfer medium; and transferring the visual image on the intermediate transfer medium onto a receiving material.

20. The image forming method according to claim 15, wherein the image bearing member is a photoreceptor having water and oil repellent properties.

21. The image forming method according to claim 20, wherein a contact angle formed by the photoreceptor and the recording liquid is not less than 30°.

* * * * *